United States Patent [19]

Farr

[11] Patent Number: 5,220,971
[45] Date of Patent: Jun. 22, 1993

[54] SHEAR BEAM, SINGLE-POINT LOAD CELL

[75] Inventor: Emory W. Farr, Covina, Calif.

[73] Assignee: Sensortronics, Covina, Calif.

[21] Appl. No.: 764,618

[22] Filed: Sep. 24, 1991

[51] Int. Cl.$^5$ .............................................. G01G 3/08
[52] U.S. Cl. ....................................... 177/229; 177/211
[58] Field of Search ............... 177/211, 226, 229, 238; 73/862.66

[56] References Cited

U.S. PATENT DOCUMENTS

| | | | |
|---|---|---|---|
| 2,597,751 | 5/1952 | Ruge | 177/211 |
| 3,805,604 | 4/1974 | Ormond | 177/211 X |
| 4,095,660 | 6/1978 | Johansson | 177/136 |
| 4,103,545 | 8/1978 | Rykwalder et al. | 177/229 X |
| 4,107,985 | 8/1978 | Sommer | 177/211 X |
| 4,146,100 | 3/1979 | Jacobson et al. | 177/211 |
| 4,459,863 | 7/1984 | Nordström | 177/211 X |
| 4,546,838 | 10/1985 | Ormond | 177/211 |
| 4,576,053 | 3/1986 | Hatamura | 73/862.66 |
| 4,657,097 | 4/1987 | Griften | 177/211 |
| 4,957,177 | 9/1990 | Hamilton | 177/211 |

FOREIGN PATENT DOCUMENTS

| | | | |
|---|---|---|---|
| 0015380 | 2/1977 | Japan | 73/862.66 |
| 0020133 | 2/1985 | Japan | 73/862.66 |

Primary Examiner—Benjamin R. Fuller
Assistant Examiner—Randy W. Gibson
Attorney, Agent, or Firm—Price, Gess & Ubell

[57] ABSTRACT

A shear beam, single-point load cell is provided. The load cell includes a shear beam with a pair of shear strain gauge sensors mounted on opposing sides thereof for measuring strain within a small portion of the shear beam. The strain gauges are isolated within sealed pockets from moisture or harsh chemicals. The use of a shear beam, rather than a bending cantilevered beam of conventional load cells, allows the load cell to be sturdier and more robust than conventional load cells, to thereby measure and detect greater amounts of load. The provision of the strain gauges positioned for measuring strain within a small portion of the shear beam allows the load cell to accurately and precisely measure loads regardless of the mounting position of the load on the load cell. Further, the provision of closely adjacent strain gauges renders the load cells relatively immune to thermal gradients inherent in conventional load cells having widely separated strain gauges. The load cell is relatively inexpensive to manufacture and maintain, and yet provides accurate and precise load measurements.

3 Claims, 3 Drawing Sheets

SHEAR BEAM, SINGLE-POINT LOAD CELL

BACKGROUND OF THE INVENTION

1. Field of the Invention

The present invention relates generally to load cells and, more particularly, to a single-point load cell.

2. Description of Related Art

A variety of single-point load cells are found in the prior art. A single-point load cell is a device adapted for mounting beneath a scale platform to measure a weight or load applied to the platform. In contrast to multiple load cells, wherein several load cells are mounted at separate locations beneath the platform, only one single-point load cell is utilized. Thus load is measured at only a single point beneath the scale platform, rather than at several points simultaneously. A desired property of the single-point load cell is that it be insensitive to bending moments produced by random placement of the load anywhere on the scale platform.

A typical single-point load cell provides a surface for mounting a platform, two or more cantilevered beams oriented to bend or strain upon the application of a load to the platform, and two or more bending beam strain gauges provided on the beams for measuring bending or strain within the beams. In the conventional single-point load cell, the bending beam strain gauges are spaced widely apart along the cantilevered beams for measuring strain at multiple points along the beams.

A conventional two-beam single-point load cell is shown in FIG. 1. The two-beam load cell of FIG. 1 includes a load cell block with a generally rectangular opening extending through the block. The opening extends almost the entire height of the load cell block, leaving only a thin connecting plate or beam at the bottom of the block and a second thin connecting plate or beam at the top of the block. Bending beam strain gauges 200 are positioned along inside surfaces of the connecting beams for measuring strain induced in the connecting beams by a load applied to a top surface of the load cell block. As can be seen from FIG. 1, strain gauges 200 are widely separated along the inside surfaces of the connecting beams.

A conventional three-beam single-point load cell is shown in FIG. 3. The three-beam load cell of FIG. 3 is similar to the two-beam load cell of FIG. 2, except that a connecting beam is provided which spans the opening of the load cell block. A plurality of bending beam strain gauges 202 are provided on opposing top and bottom sides of the connecting beam, rather than on the top and bottom connecting plates as in the two-beam load cell of FIG. 2. Alternatively, all strain gauges 202 are provided either on the top or the bottom of the connecting beam to reduce manufacturing costs. However, as with the two-beam load cell of FIG. 2, the strain gauges of the three-beam load cell are spaced widely apart along opposing ends of the connecting beam.

In the load cell designs of FIGS. 1 and 2, the strain on each beam varies substantially, depending upon the location of the load on the platform mounted to the top surface of the load cell. This variation in strain is conventionally referred to as an "eccentric" load effect. The strain gauges are spaced widely apart in an effort to compensate for the effect of an eccentric load. However, eccentric load compensation is difficult to achieve with widely separated gauge locations because of variations inherent in the structure of the load cell block as the result of normal manufacturing tolerances. Often, a secondary means of compensating for eccentric load errors is provided. However, such secondary means render the load cell more complicated and expensive to manufacture and maintain.

The connecting beams of the load cells of FIGS. 1 and 2 act as cantilevered flexures upon the application of a load to the load cell. As such, the connecting beams typically deflect substantially upon the application of a large load. Often, such a large deflection is nonlinear, and the load cell therefore suffers from nonlinearity hysteresis upon the application of the load.

Thermal gradients within the load cell block can effect the performance of the load cell when strain gauges are widely spaced. Such is a particular problem when a source of heat affects only some of the strain gauges or only a portion of the electronic circuit of the load cell.

Finally, it is often desirable or necessary to isolate the strain gauges to protect the gauges from moisture or harsh chemicals. With a plurality of strain gauges widely spaced apart, it is difficult and expensive to adequately isolate each individual strain gauge.

SUMMARY OF THE INVENTION

In view of the foregoing, it is desirable to provide a single-point load cell which is relatively unaffected by thermal gradients, relative immune to eccentric load errors, and in which strain gauges can be easily and inexpensively isolated from moisture or harsh chemicals.

Accordingly, it is an object of the invention to provide an improved single-point load cell;

It is another object of the invention to provide a single-point load cell having strain gauges closely adjacent;

It is yet another object of the invention to provide a single-point load cell which is relatively immune from eccentric load errors;

It is yet another object of the invention to provide a single-point load cell which does not require extensive secondary eccentric load compensation means;

It is yet another object of the invention to provide a single-point load cell which is relatively immune to common manufacture variations and tolerances;

It is yet another object of the invention to provide a single-point load cell having sturdier outside flexures to thereby withstand greater torsional load than bending beam load cells;

It is yet another object of the invention to provide a single-point load cell wherein strain gauges can be easily and inexpensively sealed;

It is yet another object of the invention to provide a single-point load cell wherein strain gauges are isolated from load mounting areas such that the performance of the gauges is relatively immune to mounting influences;

It is yet another object of the invention to provide a single-point load cell which is relatively accurate and precise regardless of the location of a load on the load cell mounting surface; and It is yet another object of the invention to provide a single-point load cell wherein strain gauges are sensitive only to a load rather than to a load and a torsional or bending moment induced by the load.

These and other advantages of the invention are achieved by the provision of a single-point load cell comprising: a load bearing block having top, bottom, front, and back sides, with the block having an opening extending therethrough from front sides and back side; a shear beam integrally formed with the block, with the shear beam spanning the opening to connect opposing side walls of the opening; and strain sensor means positioned with a selected small area on opposing side surfaces of the shear beam for detecting principal strains in the selected area within the shear beam. The strain sensor beams are thus located on the shear beam in such a position that they are isolated from all forces but shear forces.

In accordance with a preferred embodiment, the shear beam is formed within the opening at a position intermediate top and bottom walls of the opening and intermediate front and back sides of the load bearing block. Strain pockets are formed within opposing side surfaces of the shear beam. The strain sensor means comprises two pairs of shear strain gauges, with each pair positioned within opposing pockets. Plate members are provided over the opposing pockets for enclosing the pockets such that the pockets are substantially isolated from moisture and harsh chemicals.

Thus, the invention provides an improved single-point load cell wherein a shear beam technique is used for measuring load rather than a technique using one or more bending beams. Further, the invention provides for the measurement of strain within the shear beam in a selected small area along the shear beam such that the performance of the load cell is relatively unaffected by thermal gradients within the load cell. The provision of the shear beam allows for the load cell to be sturdier, to thereby withstand a greater torsional load than cantilevered beam load cells of the prior art. Further, the provision of strain gauge sensors, positioned within pockets isolated from mounting areas of the load cell, renders the strain gauges relatively immune to mounting influences such that the load cell can operate more precisely and accurately.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DESCRIPTION OF THE PREFERRED EMBODIMENTS

Figure 1:
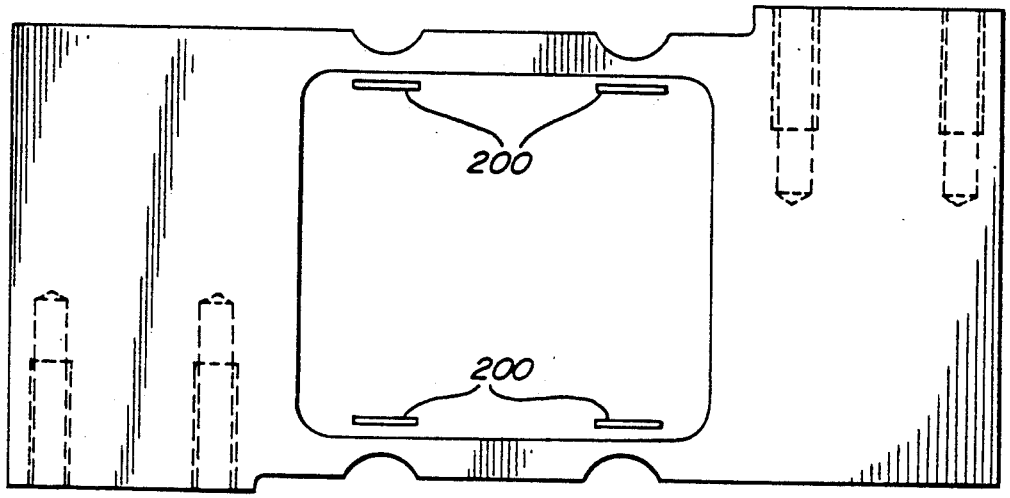
FIG. 1 is a side elevational view of a two-beam single-point load cell of the prior art.

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a single-point load cell.

With reference to FIGS. 3 through 7, a preferred embodiment of the invention will be described. A load cell 10 is provided having a load cell block 12 with an opening 14 extending through block 12.

Load cell block 12 includes front and back sides 16 and 18, respectively; top and bottom sides 20 and 22, respectively; and ends 24 and 26. Opening 14 extends from front side 16 through block 12 to rear side 18. Opening 14 has a generally rectangular cross-section, as shown in the figures. Opening 14 is formed by interior side walls 28 and 30, respectively, and interior top and bottom walls 32 and 34, respectively. Opening 14 is formed within block 12 equidistant from ends 24 and 26 of block 1 and equidistant from top and bottom sides 20 and 22 of block 12.

Opening 14 extends along almost the entire height of block 12 with top and bottom interior walls 32 and 34 aligned parallel with and adjacent to exterior top and bottom walls 20 and 22, respectively, of block 12. A portion of block 12, between interior wall 32 and top wall 20, comprises a top plate or connecting beam 36. A portion of block 12 between interior wall 34 and bottom wall 22 comprises a lower plate or connecting beam 38. A portion of block 12 between interior side wall 12 and end wall 24 comprises a first, generally square, end block 40. Likewise, a portion of block 12 between interior side wall 30 and end wall 16 comprises a second, generally square, end block 42.

A top mounting surface 44 is formed along top surface 20 of end block 40. Likewise, a lower load mounting surface 46 is formed along bottom surface 22 of end block 42. Both mounting surfaces 44 and 46 include a plurality, preferably four, mounting bores, generally denoted 48. Mounting bores 48 allow a load platform (shown only in FIG. 7) to be securely mounted to load cell 10 over mounting surfaces 44, 46. Alternatively, although not shown, bores can be provided on ends 24 and 26 of load cell 10 for receiving a mounting bracket.

A shear beam 50 spans opening 14, connecting interior side walls 28 and 30. Shear beam 50 is integrally formed with load cell block 12. Shear beam 50 includes opposing side surfaces 52 and 54 which extend parallel to block side walls 16 and 18, respectively.

A pair of shear pockets 56 and 58 are formed within opposing side walls 52 and 54 of shear beam 50, respectively. Pockets 56 and 58 are formed within the shear beam 50 equidistant from interior side walls 28 and 30. Pockets 56 and 58 each extend almost halfway through shear beam 50, leaving only a relatively thin vertical shear plate 60. Shear plate 60 includes parallel opposing side walls 62 and 64 within opposing shear pockets 56 and 58, respectively.

A pair of shear strain gauge sensors 66 are centrally positioned along surface 62 of shear plate 60. A second pair of shear strain gauge sensors 68 are centrally positioned along opposing surface 64 of shear plate 60 within pocket 58. Shear strain gauge sensor pairs 66 and 68 can comprise any conventional gauge for measuring shear strain within shear plate 60, such as by means of detecting electrical resistance, capacitance, or inductance changes, or by detecting piezoelectric and magnetostriction effects.

Thus, two pairs of shear strain gauge sensors are positioned along opposing sides of shear plate 60 for measuring strain within shear plate 60. Thus, strain is measured in a small area of shear beam 50 occupied by sensors 56, 58. This area is desirably selected so as to isolate sensors 56, 58 from all but shear forces. In the embodiment shown, the sensors are centered on shear beam 50 to achieve this purpose. The provision of strain gauge pairs 66 and 68 positioned for measuring strain at a single point substantially eliminates thermal gradient errors inherent in load cells having strain gauge sensors spaced widely apart.

Since shear plate 60 is oriented along a central longitudinal axis of the load cell, shear plate 60 is sensitive only to loads and is not sensitive to moments. Consequently, load cell 10 is somewhat less sensitive to common manufacturing variations and tolerances affecting load cells of the prior art having widely spaced sensors. Further, for an equal load, shear plate 60 deflects less than a cantilevered beam of a load cell of the prior art. Consequently, load cell 10 can be constructed to be sturdier and more robust than load cells of the prior art, and can thereby withstand more torsional loads than previous load cells. Further, since shear plate 60 deflects less than cantilevered beams of the prior art, load cell 10 can withstand greater loads without producing inelastic deflection within strain plate 60. Thus, load cell 10 is more immune to nonlinear effects and hysteresis effects than load cells of the prior art.

Figure 2:
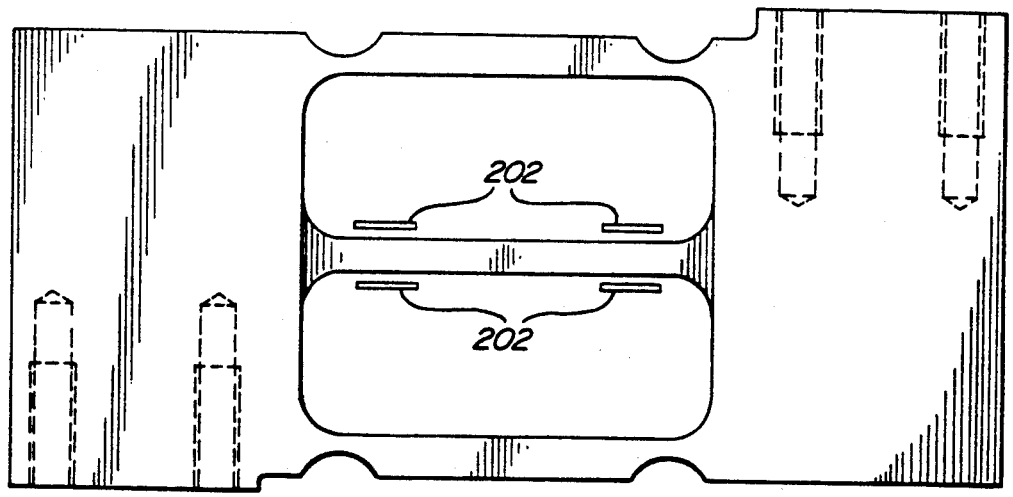
FIG. 2 is a side elevational view of a three-beam single-point load cell of the prior art.
Figure 3:
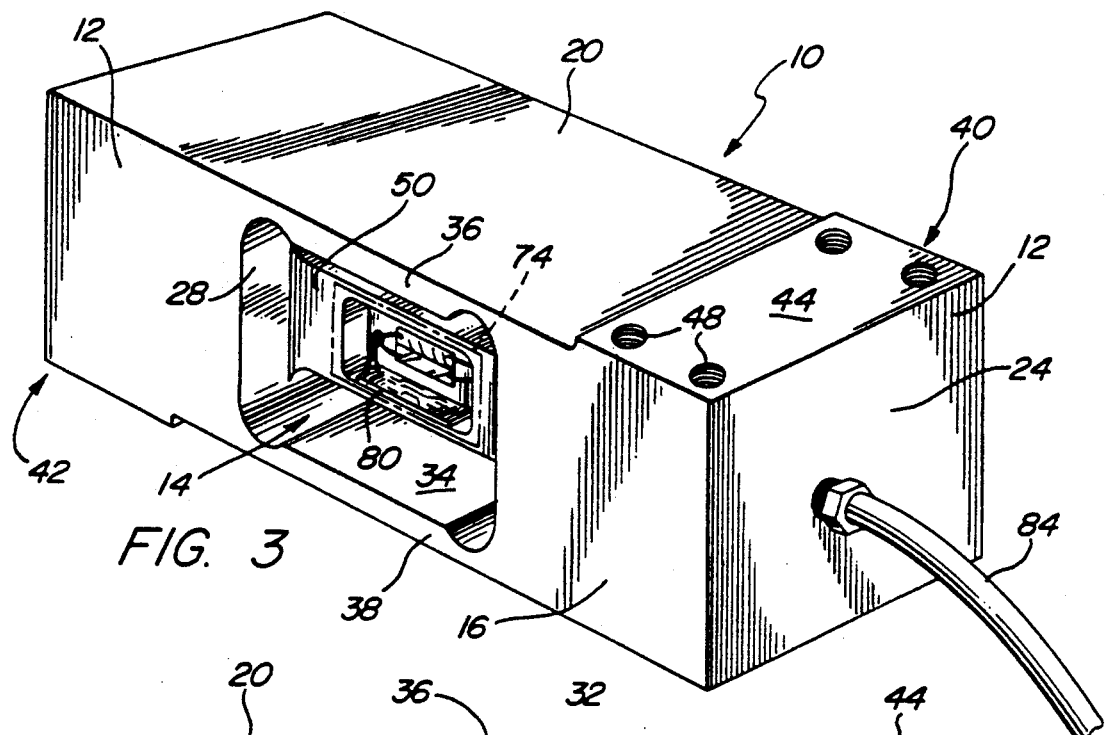
FIG. 3 is a perspective view of a single-point load cell constructed in accordance with a preferred embodiment of the invention.
Figure 4:
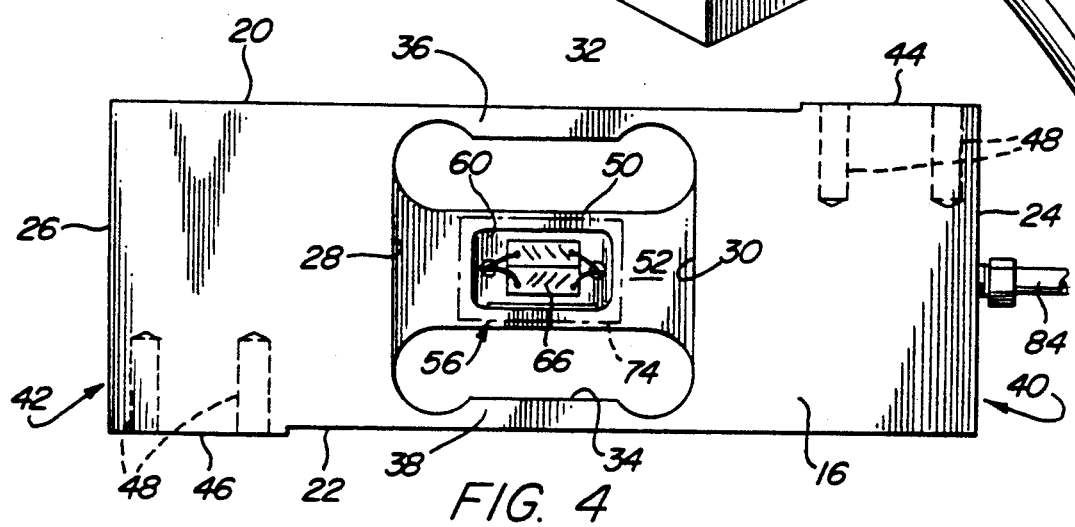
FIG. 4 is a side elevational view of the load cell of FIG. 3 showing a side thereof.
Figure 5:
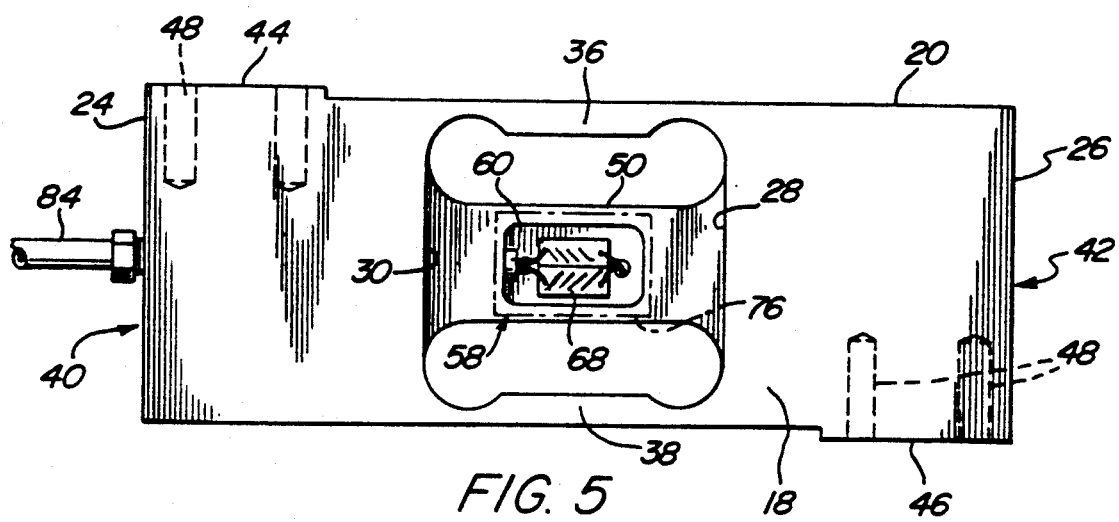
FIG. 5 is a side elevational view of the load cell of FIG. 3 showing an opposing side thereof.

Thus, the provision of strain gauge sensor pairs 66 and 68 positioned along a shear plate 60, rather than along bending beams of load cells of the prior art, allows load cell 12 to be of substantially sturdier construction than load cells of the prior art. To this end, shear beam 50 includes fluted end portions 70 and 72. Further, plate members 36 and 38 are somewhat wider and sturdier than bending plates of the prior art shown, for example, in FIGS. 1 and 2.

Shear pockets 56 and 58 are sealed by sealing plates 74 and 76, respectively, shown in phantom lines in the drawings. Sealing plates 74 and 76 completely seal the interior of shear pockets 56 and 58 from moisture, harsh chemicals, etc. Sealing plates 74 and 76 are preferably constructed of the same material as load cell block 12, and are mounted to shear beam 60 by any conventional means such as, for example, welding.

A flexible printed circuit board 80 is mounted to a lower interior side wall 82 of pocket 56. Printed circuit board 80, described in greater detail below with reference to FIG. 6, includes bridge circuit wiring necessary for processing electrical signals received from strain gauges 66 and 68.

A coaxial sensor cable 84 extends from an interior side wall 86 of pocket 58 through load block member 40 to end surface 24. Coaxial sensor cable 84 allows printed circuit board 80 to be electrically connected with an external sensor or detector (not shown).

Figure 6:
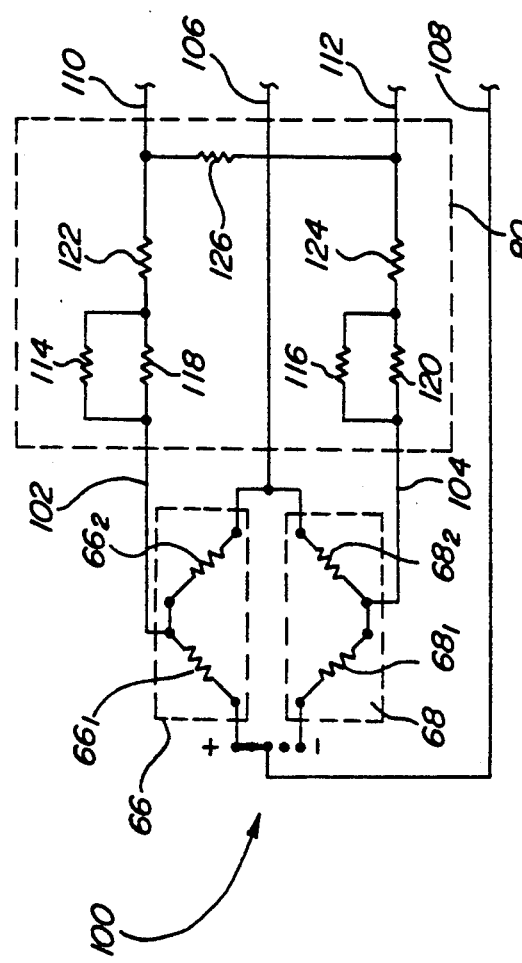
FIG. 6 is a circuit schematic representing the electronics of the load cell of FIG. 3.

With reference to FIG. 6, the wiring of load cell 10 will now be described in greater detail.

Strain sensor pair 66 includes two individual sensors $66_1$ and $66_2$ oriented along opposing axes for detecting strain changes within shear plate 60. Likewise, strain gauge pair 68 comprises individual strain gauges $68_1$ and $68_2$ oriented along opposing axes on strain plate 60. Together, strain gauges $66_1$, $66_2$, $68_1$, and $68_2$ are connected to form a bridge circuit 100. Bridge circuit 100 is connected to printed circuit board 80 via input feed wires 102 and 104, and is connected to coaxial sensor cable 84 via output lines 106 and 108. Printed circuit board 80 is connected to coaxial sensor cable 84 via input lines 110 and 112.

An input excitation voltage is applied to bridge circuit 100 via printed circuit board 80. Printed circuit board 80 includes component resistors for temperature compensation and output adjustment. Specifically, printed circuit board 80 includes respective pairs of modulus compensation and shunt trim resistors 118; 114 and 120; 116. The modulus compensation resistors 118, 120 compensate for the temperature-sensitive modulus of elasticity of the load cell material. For example, the temperature coefficient of the modulus of elasticity of steel varies ~2% per 100° F. The modulus compensation resistors may be nickel or balco (iron/nickel alloy), which decreases the load cell output by 2% per 100° F. to make the output signal of the load cell temperature independent. Shunt trim resistors 114, 116 perform a fine adjustment of the modulus temperature compensation.

Also included are a pair of span trim resistors 122 and 124. These resistors are added after measuring the load cell output in order to adjust the final output to compensate for manufacturing tolerance induced variations.

Finally, printed circuit board 80 includes an input trim resistor 126 connecting input lines 110 and 112. Input trim resistor 126 may be included if it is desired to maintain the input resistance equal to that of bridge circuit 100 alone, e.g. 350 ohms, etc.

The thus-processed input excitation signal is applied to bridge circuit 100, which operates to produce an output voltage in response to strain changes in shear plate 60 caused by a load applied to load cell 10. Bridge circuit 100 is configured such that, when no load is applied, a zero balance voltage is output to coaxial sensor cable 84 via output feed lines 106 and 108.

Thus, the electrical circuit of FIG. 6 includes electrical resistance sensors which detect strain within shear plate 60. As noted above, however, alternative shear gauges can be provided which detect strain via another electrical property such as inductance or capacitance. In such case, the electric circuit of FIG. 6 would, of course, be adapted to process the corresponding electrical signals output from the individual sensor pairs.

Figure 7:
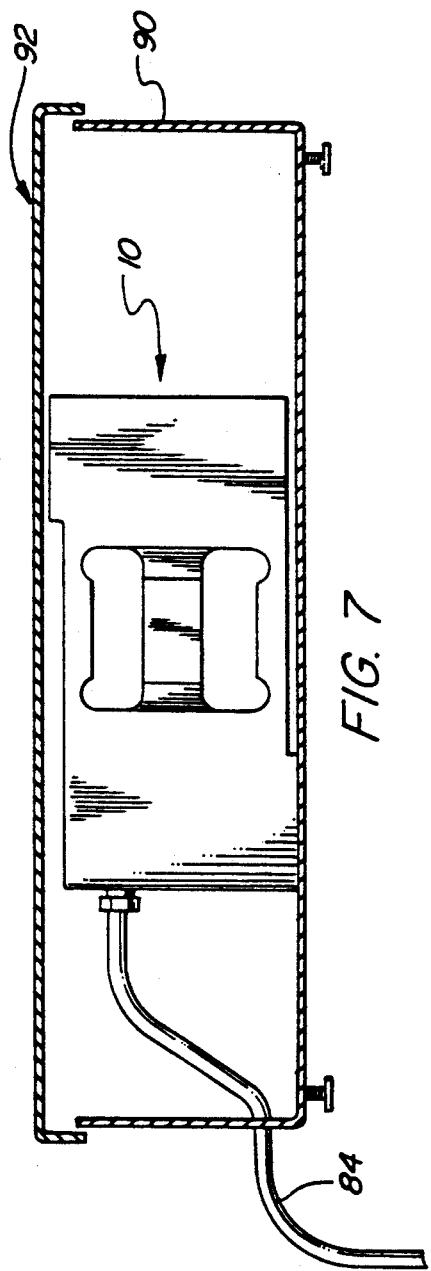
FIG. 7 is a cross-sectional view, somewhat in schematic form, of the load cell of FIG. 3, shown within a mounting platform or scale.

Referring to FIG. 7, load cell 10 is shown mounted for use within a scale platform 90. Platform 90 includes an upper flat surface 92 upon which loads can be applied. As a consequence of the design of load cell 10, discussed above, a load can be applied anywhere on surface 92 with little or no resulting variation in the output of load cell 10. Preferably, load cell 10 is bolted to the inside of platform 90 via mounting bore holes 48.

Thus, the invention provides a load cell 10 capable of accurately detecting and measuring loads regardless of the position upon which the load is mounted to the load cell. The invention achieves this result without the need for additional and expensive secondary compensation means required for compensating eccentric load errors inherent in prior art load cell designs.

Further, the provision of strain gauge pairs 66 and 68, positioned closely adjacent for measuring strain within a small area of shear beam 50, allows load cell 10 to operate accurately and precisely despite any thermal gradient within load cell block 12.

Finally, the provision of shear beam plate 60 allows load cell block 12 to be constructed of a sturdier or more robust design to enable load cell 10 to accurately and precisely detect and measure a greater load than measurable by load cells of the prior art.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A single-point load cell for attachment to a scale platform at a single point only, comprising:
   a generally rectangular, solid load bearing block having top, bottom, front, and back sides, said block having a centrally located opening extending therethrough from front side to back side, said opening having opposing interior side walls and opposing interior top and bottom walls;
   a shear beam integrally formed with and centrally positioned within said block, said shear beam spanning said opening to connect opposing said walls of said opening equidistant said top and bottom walls, and equidistant said front and back sides of said block, said shear beam having opposing strain pockets formed within opposing side surfaces thereof, said pockets being formed within said shear beam equidistant said interior side walls of said opening, said pockets each having an interior rear wall extending parallel to side surfaces of said shear beam; and
   first and second pairs of strain gauges centrally mounted on respective rear walls of said opposing pockets.

2. A single-point load cell, comprising:
   a generally rectangular, solid load bearing block having means thereon for attaching said block to a scale platform at a single point only, said block further having top, bottom, front, and back sides and first and second ends;
   an opening of generally rectangular cross-section extending through said block from the front side to the back side, said opening having opposing interior side walls and opposing interior top and bottom walls and defining an upper connecting beam and a lower connecting beam, said opening being equidistant from said first and second ends and equidistant from the top and bottom sides of said solid block and generally centered within said block;
   a shear beam integrally formed with said block, said shear beam spanning said opening to connect opposing side walls of said opening intermediate said top and bottom walls and intermediate said front and back sides of said block, said shear beam being of a thickness at least twice that of said upper connecting beam and lower connecting beam, whereby said load cell comprises a three-beam load cell;
   first and second sheer pockets located on opposing side surfaces of said shear beam, each said first and second shear pocket being centrally postured within said opening; and
   first and second strain sensor means positioned respectively in said first and second shear pockets for detecting strain in said shear beam, said first and second strain sensor means being centered on said shear beam and centered within said solid block so as to isolate each said first and second strain sensor means from all forces but shear forces.

3. The single-point load cell of claim 2, wherein said first and second strain sensor means comprises first and second pairs of strain gauges.

* * * * *